United States Patent
Chevalier et al.

(10) Patent No.: US 12,344,227 B2
(45) Date of Patent: Jul. 1, 2025

(54) CYBER-PHYSICALLY CONTROLLED AUTONOMOUS OR SEMI-AUTONOMOUS VEHICLE WITH INCREASED AVAILABILITY OVER REPETITIVE CLOSED PATHS

(71) Applicant: BeHaulT Industrial Property Office B.V., Genk (BE)

(72) Inventors: Philippe Arthur Jean Ghislain Chevalier, Deinze (BE); Geoffrey Ejzenberg, Lier (BE); Noël Jans, Val-Meer (BE)

(73) Assignee: BeHaulT Industrial Property Office B.V., Genk (BE)

( * ) Notice: Subject to any disclaimer, the term of this patent is extended or adjusted under 35 U.S.C. 154(b) by 388 days.

(21) Appl. No.: 17/767,271

(22) PCT Filed: Oct. 9, 2020

(86) PCT No.: PCT/EP2020/078472
§ 371 (c)(1),
(2) Date: Apr. 7, 2022

(87) PCT Pub. No.: WO2021/069697
PCT Pub. Date: Apr. 15, 2021

(65) Prior Publication Data
US 2022/0371574 A1    Nov. 24, 2022

(30) Foreign Application Priority Data
Oct. 9, 2019    (WO) .................. PCT/EP2019/077355

(51) Int. Cl.
*B60W 20/13*    (2016.01)
*B60W 60/00*    (2020.01)

(52) U.S. Cl.
CPC ........ *B60W 20/13* (2016.01); *B60W 60/0023* (2020.02)

(58) Field of Classification Search
None
See application file for complete search history.

(56) References Cited

U.S. PATENT DOCUMENTS

| | | | |
|---|---|---|---|
| 7,147,073 B2 | 12/2006 | Mollhagen | |
| 7,604,300 B2 | 10/2009 | Whitfield, Jr. et al. | |

(Continued)

FOREIGN PATENT DOCUMENTS

| | | | |
|---|---|---|---|
| CN | 103527697 A | 1/2014 | |
| CN | 103612548 A | 3/2014 | |

(Continued)

OTHER PUBLICATIONS

Grieves, Michael, et al., "Digital Twin: Mitigating Unpredictable, Undesirable Emergent Behavior in Complex Systems," Transdisciplinary Perspectives on Complex Systems: New Findings and Approaches, pp. 85-113 (2017).

*Primary Examiner* — Amelia Vorce
(74) *Attorney, Agent, or Firm* — Hoffmann & Baron, LLP

(57) ABSTRACT

A hybrid dump truck for surface mining, comprising a cyber-physical system including a sensing system and a control system, and a driving unit for performing autonomous driving of the dump truck along a travel path using at least the sensory data of the sensing system, wherein the closed cycle path is determined based on topographical data, wherein the control system is configured to control a cyclic energy level of the electric energy storage unit, wherein rates of change of power during autonomous or semi-autonomous driving of the hybrid dump truck from a predetermined reference point of the closed cycle path along said closed cycle path are controlled based on a desired velocity such as (Continued)

to reduce a difference in energy levels of the electric energy storage unit at the reference point of the closed cycle path.

25 Claims, 11 Drawing Sheets

(56) References Cited

U.S. PATENT DOCUMENTS

| | | | |
|---|---|---|---|
| 8,975,866 B2 | 3/2015 | McGrath et al. | |
| 2006/0005736 A1 | 1/2006 | Kumar | |
| 2006/0005738 A1 | 1/2006 | Kumar | |
| 2008/0303336 A1 | 12/2008 | Whitefield et al. | |
| 2016/0114701 A1* | 4/2016 | Heinen | B60M 7/003 191/2 |
| 2016/0118828 A1* | 4/2016 | Berry | E21C 31/12 307/10.1 |
| 2017/0305290 A1* | 10/2017 | Huff | B60K 1/00 |
| 2018/0282968 A1* | 10/2018 | Hita | B60W 20/00 |
| 2020/0156500 A1* | 5/2020 | Huff | B60L 58/22 |
| 2022/0219546 A1* | 7/2022 | Kouvo | B60L 9/00 |
| 2024/0044094 A1* | 2/2024 | Kramer | E01H 1/003 |

FOREIGN PATENT DOCUMENTS

| | | |
|---|---|---|
| CN | 103612582 A | 3/2014 |
| CN | 203585188 U | 5/2014 |
| CN | 203697894 U | 7/2014 |
| CN | 203697947 U | 7/2014 |
| CN | 203698058 U | 7/2014 |
| EP | 1359032 A2 | 11/2003 |
| JP | 2000029901 A | 1/2000 |
| JP | 2015231777 A | 12/2015 |
| JP | 6309355 B2 | 4/2018 |
| JP | 2018103984 A | 7/2018 |
| JP | 6511175 B2 | 5/2019 |
| WO | 2018000944 A1 | 1/2018 |
| WO | 2019064733 A1 | 4/2019 |

* cited by examiner

CYBER-PHYSICALLY CONTROLLED AUTONOMOUS OR SEMI-AUTONOMOUS VEHICLE WITH INCREASED AVAILABILITY OVER REPETITIVE CLOSED PATHS

CROSS-REFERENCE TO RELATED APPLICATIONS

This application is a U.S. National Phase application of International Application No. PCT/EP2020/078472, filed Oct. 9, 2020, which claims priority to application number PCT/EP2019/077355, filed Oct. 9, 2019, the disclosures of which are incorporated herein by reference in their entirety.

TECHNICAL FIELD

The present invention relates to a vehicle with a cyber-physical system, and a method for controlling the vehicle. The invention further relates to a cyber-physical system for a vehicle, and the use of the cyber-physical system in the vehicle.

BACKGROUND ART

Vehicles may be used for transportation along a cyclic path, e.g. a closed loop path with a start point and end point being located substantially at a same location. There is a need to better manage vehicles performing transportation along such cyclic closed paths. In such cases, typically, prior art vehicles fail to adequately manage energy levels of their energy storage units. There is a need to obtain a better control of a cyclic energy level of the energy storage units of vehicles. An exemplary vehicle that can be operated to move along such cyclic closed paths is a mining truck. Heavy-duty mining dump trucks are widely used in surface mining for hauling activities. These hauling activities comprise the movement of overburden and ore from a certain point in the mine to another point over well-defined routes (typically cyclic closed loops). Design, theory, calculations about heavy-duty wheeled vehicles are discussed by Boris N. Belousov and Sergei D. Popov [Belousov2014].

The term cyber-physical system (CPS), as given in the National Science Foundation document NSF19553, may refer to engineered systems that are built from, depend upon, the seamless integration of computation and physical components. CPS tightly integrate computing devices, actuation and control, networking infrastructure, and sensing of the physical world. The system may include human interaction with or without human aided control. CPS may also include multiple integrated system components operating at wide varieties of spatial and temporal time scales. They can be characterized by architectures that may include distributed or centralized computing, multi-level hierarchical control and coordination of physical and organizational processes. CPS is a holistic approach to the design of machines.

Advances in CPS should enable capability, adaptability, scalability, resilience, safety, security, and usability far beyond what is available in the simple embedded systems of today. CPS technology will transform the way people interact with engineered systems—just as the Internet has transformed the way people interact with information. CPS are driving innovation and competition in a range of sectors, including agriculture, aeronautics, building design, civil infrastructure, energy, environmental quality, healthcare and personalized medicine, manufacturing, and transportation.

The term hybrid electric refers to a vehicle that combines a conventional internal-combustion engine (ICE) with an electric propulsion system. The presence of the electric powertrain is intended to achieve either better fuel economy than a conventional vehicle or better performance.

There is a clear difference between the terminology used in the standard ISO 17757:2019 and the standard SAE J3016, that describes the six level-specific driving automation modes (level 0 to level 5). The SAE J3016 is mainly applicable for normal vehicles while ISO 17757:2019 is mainly applicable for off-highway machines and particularly for mining dump trucks.

The term ASAM, for instance according to ISO 17757:2019, refers to both semi-autonomous machines operating in autonomous mode and autonomous machines.

The term autonomous mode, for instance according to ISO 17757:2019, is defined as mode of operation in which a mobile machine performs all machine safety-critical and earth-moving or mining functions related to its defined operations without operator interaction. The operator could provide destination or navigation input but is not needed to assert control during the defined operation.

The term autonomous machine, for instance according to ISO 17757:2019, refers to a mobile machine that is intended to operate in autonomous mode during its normal operating cycle.

The term semi-autonomous machine, for instance according to ISO 17757:2019, refers to a mobile machine that is intended to operate in autonomous mode during part of its operating cycle and which requires active control by an operator to complete some of the tasks assigned to the machine.

The term digital twin [Grieves2016] refers to a set of virtual information constructs that fully describes a potential or actual physical manufactured product from the micro atomic level to the macro geometrical level. At its optimum, any information that could be obtained from inspecting a physical manufactured product can be obtained from its digital twin.

The standard heavy-duty mining dump trucks are found in the publications of Caterpillar, Hitachi, Komatsu, Liebherr and BelAz. An example of such a standard heavy-duty mining dump truck is given in patent publication 1. A standard heavy-duty mining dump truck used in surface mines has generally a single unit frame equipped with two axles and six tires. The front axle is equipped with two steering, but non-driving wheels and the rear axle is equipped with four non-steering driving wheels as shown in patent publication 2.

A hybrid dump truck for mining is described in the patent publications 3, 4 and 5. In all these patent publications is described a hybrid dump-truck capable of improving fuel consumption reduction effect by electric power charged in a power storage device. A first remark is that the terminology used in this patent publication is not correct. There is no power storage device but an energy storage device. A battery is storing electric energy having its amount of energy expressed in Wh using SI units. The invention is related to a particular operational profile denoted Hodo that can be summarized as the closed trajectory: Hodo field, long uphill, pit entrance, long downhill unloaded, loading site, long uphill loaded, pit exit, long downhill loaded, Hodo field. The hybrid dump truck is equipped with a control unit for controlling the power storage device in such a way that the remaining stored electric quantity of the power storage device at a loading location is smaller than a remaining stored electric quantity of the power storage device at an unloading location. This statement in the abstract is generally false. The major constraints should be that the total energy difference between the start and end state of the closed trajectory (Hodo-to-Hodo) is approximately zero, as shown in FIG. 6, and that the constraints related to the required rate of change of the electric power for the batteries is within the specifications of the battery manufacturer. Making the total energy difference between the start and end state zero is done by selecting the rate of change of electric power as function of the trajectory segments. This is managed by the cyber-physical system on a real-time base because of the disturbances that the mining dump truck experiences on its trajectory. If it suddenly starts raining, then the amount of motor power will have to be changed due to changes in the rolling resistance and coefficient of friction of the soil. The total energy difference constraint and the constraint of the rate of change of the electric power will limit the maximum velocity of the mining dump truck and this velocity defines the minimum optimum overall trip time. Deviation of that optimum time will be generated by the changes in velocity due to the curves in the mine trajectory and environmental changes. The present invention minimizes these trip time losses by the cyber-physical system that optimizes the orientation of the individual bogies and the applied torques on the individual wheels of the mining dump truck.

The optimal approach is the creation of a digital twin of the complete haulage process. The parameters of the digital twin are based on parameters that are fixed by the mine layout and its time evolution, the soil type, the type of ore/overburden hauled, the environmental conditions and the design parameters of the mining dump truck and the total cost of ownership (TCO) of the mining dump truck. Optimization of this haulage problem results in a performance parameter that can be expressed in $/(metric ton×hours) or $/(metric ton×km) on a yearly basis. So, time or range enter the key performance indicator. This throughput performance indicator of the haulage process is the major concern of the mine manager. From this digital twin one can see that the proposed solution of patent publications 3, 4 and 5 is suboptimal.

The present invention remedies this deficiency of the patent publications 3, 4 and 5 by including the above-mentioned digital twin in the core of the cyber-physical system of the mining dump truck. The digital twin will predict the required energy, the required power and the required rate of change of power based on the predetermined closed cyclic path in the surface mine. These values are the nominal states for the cyber-physical system of the mining dump truck disclosed in this invention. These values determine the mining dump truck hybrid energy configuration.

Patent publication 6 discloses an electric hybrid truck. The disadvantage of this invention is in the layout of the invertors and electrical motors. It is obvious that a failure of the invertor will bring the mining dump truck to a halt because one inverter is controlling three electrical motors. The simultaneous drive of the electrical motors is not beneficial for traction especially when performing a cornering operation. Simultaneous drive will increase the wear of the tires of the left and right drive wheels when cornering. There is also no electric energy storage unit described connected to the electric drivetrain to use the energy of regenerative braking. The present invention is robust for single point failures in the electric drivetrain. This is easily accomplished by linking one inverter to one electric motor. A failure of one invertor will in the present invention not bring the truck to a standstill. Its maximum impact is a potential reduction of the truck's performance. Any way the cyber-physical system will send the truck to the maintenance bay in the case of the occurrence of such an event. It is even so, that for a typical mine layout a failure of the engine will not bring the truck to a standstill because enough energy is stored in the electric energy storage unit to allow the truck to move to the maintenance bay to repair or exchange the engine.

Patent publication 7 discloses a hybrid dump truck capable of improving productivity. The described system relies on a driver that controls the accelerator pedal. However, the hybrid dump truck needs a computerized system to improve the productivity. The control loop should operate such that the difference in energy level of the battery system at the end and at the start is minimized to zero. This control loop is jeopardized by the driver that can at free change the depression amount of the accelerator pedal. Doing so, the driver will not follow the optimized closed cycle path as is the case when the hybrid dump truck is containing a cyber-physical system. It is known that the higher the state of charge of an electrical battery unit the longer the lifetime of the battery. It is also known that the smaller the change between the maximum state of charge and the minimum state of charge of the electric battery unit the longer the lifetime of the battery. This fine tuning can only be done using advanced cyber-physical systems resulting in the improved productivity.

Patent publication 8 discloses a battery electric mining dump truck belonging to the class of battery electrical vehicles (BEV). It is not addressing the electric energy housekeeping of the battery system that is crucial in real mine layouts. Battery electric mining dump trucks can only operate in very specific mine layouts as demonstrated to leading companies in the mining industry by using our proprietary digital twin for mining dump trucks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity. The standards and norms provided in the specification are to be interpreted merely as examples and are given by way of non-limitative illustration.

Although above examples are given for wheeled vehicles, such as the dump truck, it will be appreciated that the current invention can be employed for all kind of vehicles (e.g. cars, all kind of wheeled vehicles, flying vehicles, naval vehicles, and/or vehicles being configured to operate in different modes). The current invention is not limited to the exemplary dump trucks.

PRIOR ART DOCUMENTS

Patent Publications
Patent publication 1: U.S. Pat. No. 7,604,300 (LIEBHERR MINING EQUIP) 20 Oct. 2009;
Patent publication 2: EP 1359032 A2 (LIEBHERR WERK BIBERACH) 5 Nov. 2003;
Patent publication 3: JP 6309355 B2 (HITACHI CONSTRUCTION MACHINERY) 11 Apr. 2018;

Patent publication 4: JP 6511175 B2 (HITACHI CONSTRUCTION MACHINERY) 15 May 2019;
Patent publication 5: JP 2018103984 (A) (HITACHI CONSTRUCTION MACHINERY) 5 Jul. 2018;
Patent publication 6: WO 2019064733 A1 (HITACHI CONSTRUCTION MACHINERY) 4 Apr. 2019;
Patent publication 7: JP 200029901 A (KOMATSU LIMITED) 9 Apr. 1999; Patent publication 8: WO 201800944 (BYD COMPANY) 4 Jan. 2018.

Monograph Documents

Groves, Paul D., Principles of GNSS, INERTIAL, AND MULTISENSOR INTEGRATED NAVIGATION SYSTEMS, Artech House, ISBN-13:978-1-58053-255-6, 2008.

Belousov, Boris N. and Popov, Sergei D., Heavy-Duty Wheeled Vehicles: Design, Theory, Calculations, SAE International, ISBN: 978-0-7680-7723-0, 2014.

Geck, Paul, Automotive lightweighting using advanced high-strength steels, SAE International, ISBN: 978-0-7680-7978-4, 2014.

M. Grieves and J. Vickers, Digital Twin: Mitigating Unpredictable, Undesirable Emergent Behavior in Complex Systems, Transdisciplinary Perspectives on Complex Systems, pp 85-113, August 2016.

Article Document

NSF19553, Cyber-Physical Systems (CPS), National Science Foundation, Feb. 13, 2019.

Standard Document

ISO 17757:2019, Earth-moving machinery and mining—Autonomous and semi-autonomous machine system safety, Second edition 2019 July.

IEC 60825-1:2014, Safety of laser products—Part 1: Equipment classification and requirements, Edition 3.0, 2014 May 15.

IEEE 802.11-2016, IEEE Standard for Information technology—Telecommunications and information exchange between systems Local and metropolitan area networks—Specific requirements—Part 11: Wireless LAN Medium Access Control (MAC) and Physical Layer (PHY) Specifications, 2016 Dec. 14.

SAE J3061-JAN2016, Cybersecurity Guidebook for Cyber-Physical Vehicle Systems, SAE International, Issued 2016 January.

SUMMARY OF THE INVENTION

It is an object of the invention to provide for a method and a system that obviates at least one of the above-mentioned drawbacks.

The invention enables improvement of the values of the key performance indicators of open surface mine haulage. Many mining companies consider the key performance indicator for haulage as the overall yearly cost per metric ton. In doing so, lumped characteristics are considered showing a black-box approach like the rimpull curve of a mining dump truck. We are convinced that the metric based on yearly throughput per haulage route expressed in cost per metric ton is not the correct metric for comparing mining dump trucks in a future investment scenario. This selection process, using a digital twin of the dump trucks, can be performed by comparing classical dump trucks with hybrid mining dump trucks or even full-electric mining dump trucks. The parameters of the digital twin of the hybrid electric dump truck can be varied in such a way to obtain a digital twin of a mining hybrid electric dump truck that optimizes the key performance indicators for a surface mining environment. As the mine layout changes over time one should be able to change the parameters of the digital twin to keep the highest values in the key performance indicators and to implement these parametric changes in the physical version of the dump truck. The digital twin of the hybrid electric dump truck is at the core of the cyber-physical system and is used by the cyber-physical system to control the mining hybrid electric dump truck in its physical space and cyberspace. The digital twin of the hybrid electric dump truck shows that several parameters of a hybrid electric dump truck have a large effect on the throughput of the overall mine.

The present invention, therefore, has the object of disclosing one of these embodiments as a cyber-physical hybrid electric autonomous or semi-autonomous off-highway dump truck for surface mining industry.

A detailed analysis of the haulage process has resulted in a digital twin that can compare different haulage scenarios. The digital twin takes in account the detailed physics (truck inertia, rolling resistance, aerodynamic drag, slope of the track, coefficient of friction, tire dynamics, cornering and traction) of driving a mining dump truck along the selected closed track in the mine. This allows for optimization of the haulage process. The digital twin is an integral part of the cyber-physical hybrid electric autonomous or semi-autonomous off-highway dump truck for surface mining industry. When creating a business case, based on the present invention, one obtains improvements varying from 20 percent to 60 percent expressed in cost per (metric ton×hours) or in cost per (metric ton×km). Even in the case of the 'wrong metric', one obtains improvements of minimum 20 percent expressed in cost per metric ton.

According to an aspect, the invention provides for a vehicle comprising: a drivetrain containing an electric motor coupled to a propulsion unit; at least one electric generator connected to an engine for delivering electrical energy to the drivetrain, an energy storage unit for storing and retrieving energy; a cyber-physical system including a sensing system and a control system, the sensor system comprising a plurality of on-board sensors for providing sensory data for use with autonomous or semi-autonomous moving of the vehicle in a cyclic mode along a predefined closed cycle path known to the cyber-physical system; and a handling unit for performing autonomous or semi-autonomous moving of the vehicle along the closed cycle path in the cyclic mode using at least the sensory data, wherein the closed cycle path is determined based on geographical or route data; and wherein the cyber-physical system is configured to equalize the energy levels of the energy storage unit at the closure of one cycle, determined by the complete round-trip performed by the vehicle, under the rates of change of power constraints of the energy storage unit during autonomous or semi-autonomous moving of the vehicle along said closed cycle path.

The rate of change of power of the electric energy storage unit can be controlled in an advantageous way during autonomous or semi-autonomous driving.

Optionally, equalization of the energy levels of the energy storage unit is based on a desired velocity such as to reduce a difference in energy levels of the energy storage unit at the reference point, being the start and end point of the closed cycle path.

The start point and end point can be predetermined and known by the cyber-physical system. The start point and end point may define a round-trip for the vehicle. The cyber physical system may have access to all the available data, including the topographical data and sensory data. It will be appreciated that the rates of change of power of the energy storage unit may be controlled based on other parameters in addition to the desired velocity. The rate of change of power (i.e. second derivative of energy) of the energy storage unit (e.g. battery) can be controlled. In this way, for example limitations in rate of change of power associated to the energy storage unit can be taken into account. For example, the cyber physical system (CPS) can monitor the rate of change of power to prevent exceeding requirement specifications of a battery. The battery may have a maximum discharge rate and maximum charge rate for instance. The control of the rate of change of power may for instance be achieved by means of a non-linear control element (cf. active control).

The cyber-physical system can monitor the rate of change of power and take into account the boundary conditions required by the energy storage unit. By controlling the rate of change of power according to a predefined 'template', a difference in energy levels of the electric energy storage unit at the reference point of the closed cycle path can be reduced. This can be done as the closed travel path is known to the CPS (predetermined between start point and end point) and the desired velocity of the dump truck along the closed travel path is also known.

The feature of controlling a cyclic energy level of the electric energy storage unit, wherein rates of change of power of the electric energy storage unit during autonomous driving of the hybrid dump truck from a predetermined start point to a predetermined end point defining a round-trip along said travel path are controlled based on a desired velocity such as to reduce a difference in energy levels of the electric energy storage unit at the reference point of the closed cycle path, provides significant advantages. Potential issues with regenerative charging of the battery can be effectively overcome. The truck can be controlled during autonomous driving such that the energy level of the electric energy storage unit at the reference point of the closed cycle path are substantially equal, such as to avoid that the battery will either go empty during autonomous driving or be charged too much.

Optionally, the control system is configured to control a cyclic energy level of the electric energy storage unit, wherein rates of change of power of the electric energy storage unit during autonomous driving of the vehicle from a predetermined reference point of the closed cycle path defining a round-trip along said closed travel path are controlled based on a desired velocity such as to reduce a difference in energy levels of the electric energy storage unit at the reference point of the closed cycle path.

Optionally, equalization of the energy levels of the energy storage unit is based on a predefined longitudinal velocity.

Optionally, the predefined longitudinal velocity is selected such as to maximize key performance indicators of the vehicle, such as an availability of the vehicle.

Optionally, rates of change of power are adjusted during autonomous or semi-autonomous moving along said closed travel path such as to minimize the energy difference over the given closed cycle path.

Optionally, the difference in energy of the energy storage unit over the given closed cycle path is minimized to zero.

Optionally, the control system is configured to control the rates of change of power of the energy storage unit based at least on the amount of payload carried by the vehicle along the predetermined closed cycle path.

Optionally, the control system is configured to control the rates of change of power of the energy storage unit so as to avoid overcharging or extreme discharge of the energy storage unit (e.g. electrical battery unit).

Optionally, the control system is configured to select the rates of change of power of the energy storage unit and/or charging and discharging time intervals such that the overall energy consumption is minimized.

Optionally, the energy levels of the electric energy storage unit at the reference point of the closed cycle path are in a range of 20% to 90% of the maximal electric energy capacity of the electric energy storage unit, more preferably in a range of 75% to 90%.

Optionally, the control system is configured to employ a trained artificial neural network (ANN) for controlling the rate of change of power of the energy storage unit during autonomous or semi-autonomous moving, wherein the artificial neural network is trained based on historical data stored by the cyber-physical system.

Optionally, the cyber-physical system includes a plurality of embedded systems, in a wheel topology, distributed at different locations of the vehicle, forming a decentralized network.

Optionally, the sensing system comprises a situational awareness system.

Optionally, the engine is a hydrogen-based power pack unit.

Optionally, the energy storage unit is based on at least one of a fuel-cell battery or a kinetic energy storage unit, preferably based on a flywheel.

Optionally, the engine is equipped with an auto shutdown mechanism, wherein the auto shutdown mechanism is arranged to automatically shut down based on an event detected by the cyber-physical system.

Optionally, the vehicle is configured to operate in full autonomous mode, wherein the vehicle is arranged without a command post or cabin.

Optionally, the energy storage unit is connected to an on-board trolley unit with pantograph allowing the vehicle to connect to an electric grid distributed along the well-defined closed cycle path such as to operate in full electric mode.

Optionally, the vehicle is a wheeled motor vehicle.
Optionally, the vehicle is a naval vessel.
Optionally, the vehicle is a flying vehicle.
Optionally, the vehicle is a hybrid dump truck.
Optionally, the hybrid dump truck is arranged for surface mining, and wherein the dump truck comprises: at least two axles with wheels associated therewith; a distributed drivetrain composed of units each containing an electric motor coupled to a wheel via a gearbox.

According to an aspect, the invention provides for a method for controlling a vehicle, the vehicle comprising a drivetrain containing an electric motor coupled to a propulsion unit, at least one electric generator connected to an engine for delivering electrical energy to the drivetrain, a rechargeable energy storage unit for storing and retrieving energy, a cyber-physical system including a sensing system and a control system, the sensor system comprising a plurality of on-board sensors for providing sensory data for use with autonomous moving of the vehicle in a cyclic mode along a predefined closed cycle path known to the cyber-physical system; wherein a handling unit is provided for performing autonomous moving of the vehicle along the closed cycle path in the cyclic mode using at least the sensory data, wherein the closed cycle path is determined based on geographical or route data; wherein the cyber-physical system is configured to equalize the energy levels of the energy storage unit at the closure of one cycle, determined by the complete round-trip performed by the vehicle, under the rates of change of power constraints of the energy storage unit during autonomous or semi-autonomous moving of the vehicle along said closed cycle path.

According to an aspect, the invention provides for a cyber-physical system of the vehicle according to the invention.

According to the invention, it is possible to create a cyber-physical vehicle, such as for instance a hybrid electric autonomous or semi-autonomous off-highway dump truck for surface mining industry, or any other kind of vehicle, that results in a substantial improvement of the (e.g. haulage) key performance indicators (e.g. of the surface mining industry).

According to an aspect, the invention provides for a hybrid dump truck for surface mining, comprising: at least two axles with wheels associated therewith; a distributed drivetrain composed of units each containing an electric motor coupled to a wheel via a gearbox; at least one electrical generator connected to an engine for delivering electrical energy to the distributed drivetrain; a rechargeable electric energy storage unit for storing and retrieving energy; a cyber-physical system including a sensing system and a control system, the sensor system comprising a plurality of on-board sensors for providing sensory data for use with autonomous driving of the dump truck; and a driving unit for performing autonomous driving of the dump truck along a travel path using at least the sensory data, wherein the closed cycle path is determined based on topographical data; and wherein the control system is configured to control a cyclic energy level of the electric energy storage unit, wherein rates of change of power during autonomous driving of the hybrid dump truck from a reference point of the closed cycle path along said closed travel path are controlled based on a desired velocity such as to reduce a difference in energy levels of the electric energy storage unit at the predetermined reference point of the closed cycle path.

The cyber-physical truck can be configured to enforce an energy balance (energy management) of the electric energy storage unit to ensure that at the predetermined reference point of the closed cycle path the difference between energy levels at that point is reduced during operation.

Optionally, rates of change of power during autonomous driving of the hybrid dump truck are adjusted during driving along said closed travel path such as to minimize the difference in energy levels of the electric energy storage unit at the reference point of the closed cycle path.

Optionally, the difference is minimized to zero.

Advantageously, the energy level difference can be reduced in order to have a same level after a full trip (e.g. closed cycle path). In this way, the energy level can be equal at the reference point of the closed cycle path. The control system can be configured to operate the truck such that the difference is substantially equal to zero, or within a small range from each other, for instance the difference being smaller than 5%, more preferably smaller than 2%, even more preferably smaller than 1%.

Advantageously, potential issues with regenerative charging of the electric energy storage unit can be effectively overcome. The truck can be controlled during autonomous or semi-autonomous driving such that the energy level of the electric energy storage unit at the reference point of the closed cycle path are substantially equal, such as to avoid that the electric energy storage unit will either go empty during autonomous driving or be charged too much.

Optionally, the control system is configured to control the rates of change of power so as to avoid overcharging of the electric energy storage unit.

Overcharging can deteriorate or damage the electric energy storage unit which can be effectively avoided by means of the invention. The balance can be controlled based on the predetermined closed cycle path.

Optionally, the control system is configured to control the rates of change of power based at least on the amount of payload carried by the dump truck along the predetermined closed cycle path.

For example, the truck may drive faster or slower so that the difference at the reference point of the closed cycle path is zero (compensation).

Advantageously, also route information along the closed cycle path (3D route, pavement, etc.) is taken into account by the control system.

Optionally, the control system is configured to select the rates of change of power and/or charging and discharging time intervals such that the overall energy consumption is minimized.

Optionally, the energy levels of the electric energy storage unit at the reference point of the closed cycle path are in a range of 20% to 90% of the maximal electric energy capacity of the electric energy storage unit, more preferably in a range of 75% to 90%.

The lifetime and the availability of the electric energy storage unit can be effectively increased.

Optionally, the control system is configured to use a trained artificial neural network (ANN) for controlling the rate of change of power during autonomous driving, wherein the artificial neural network (ANN) is trained based on historical data recorded by the cyber-physical system during the cyclic movements along the closed path.

Optionally, the engine is a hydrogen-based power pack unit.

Optionally, the electric energy storage unit is based on at least one of a fuel-cell battery, or a kinetic energy storage unit, preferably based on a flywheel. Optionally, the engine is equipped with an auto shutdown mechanism, wherein the auto shutdown mechanism is arranged to automatically shut down based on an event detected by the control system.

Optionally, the hybrid dump truck is configured to operate in full autonomous mode, wherein the dump truck is arranged without a cabin. Optionally, the electric energy storage unit is connected to a trolley unit with pantograph allowing the hybrid dump truck to operate in full electric mode.

According to an aspect, the invention provides for a method for controlling a hybrid dump truck for surface mining, wherein the hybrid dump truck includes: at least two axles with wheels associated therewith; a distributed drivetrain composed of units each containing an electric motor coupled to a wheel via a gearbox; at least one electrical generator connected to an engine for delivering electrical energy to the distributed drivetrain; a rechargeable electric energy storage unit for storing and retrieving energy; a cyber-physical system including a sensing system and a control system, the sensor system comprising a plurality of on-board sensors for providing sensory data for use with autonomous driving of the dump truck; and a driving unit for performing autonomous driving of the dump truck along a travel path using at least the sensory data, wherein the travel path is determined based on topographical data; wherein the hybrid dump truck is controlled using the control system, wherein a cyclic energy level of the electric energy storage unit is controlled, wherein rates of change of power during autonomous driving of the hybrid dump truck from a predetermined reference point along said closed cycle path are controlled based on a desired velocity such as to reduce a difference in energy levels of the electric energy storage unit at the reference point of the closed cycle path.

According to an aspect, the invention provides for a cyber-physical control system of the hybrid dump truck according to the invention.

It will be appreciated that any of the aspects, features and options described in view of the dump truck apply equally to the method and the described cyber-physical system. It will also be clear that any one or more of the above aspects, features and options can be combined.

The scope of the present disclosure is defined by the appended claims, and all changes or modifications derived from the meaning and scope of the claims or their equivalents should be interpreted as falling into the scope of the present disclosure.

BRIEF DESCRIPTION OF THE DRAWINGS

The foregoing and the following detailed description are better understood when read in conjunction with the appended drawings. For the purposes of illustration, examples are shown in the drawings; however, the subject matter is not limited to the specific elements and instrumentalities disclosed.

In the drawings.

DESCRIPTION OF EMBODIMENTS

Terminology used herein is for the purpose of describing particular embodiments only and is not intended to be limiting of the invention.

Below, an embodiment of the present invention will be described from the point of view of a driver. The meaning of front, rear, left and right are from the perspective of a normal driver.

Examples are provided to explain the present invention and are not a limitation.

Various changes and modifications obvious to one skilled in the art to which the present invention pertains are deemed to be within the spirit, scope and contemplation of the present invention.

While the present invention has been described with respect to certain embodiments, it will be apparent to those skilled in the art that various changes and modifications may be made without departing from the scope of the invention as defined in the claims.

The present invention relates to a cyber-physical hybrid electric autonomous or semi-autonomous (ASAM) off-highway dump truck for surface mining industry.

Exemplary embodiments of the overall configuration of the mining dump truck are provided below.

The cyber-physical hybrid electric dump truck is a multi-axle truck having at least two axles. Each axle is equipped with two independently vertically rotating bogies that have each two individual wheel drives (IWD). Each bogie contains two synchronous electric AC drive electric motors connected to a multi-stage hub reduction gearbox. The truck can be classified as an all-wheels drive and all-wheels steer dump truck known as a N×N configuration where N is the number of wheels. The truck can be configured for transporting payloads starting at 90 metric tons and up.

Figure 1:
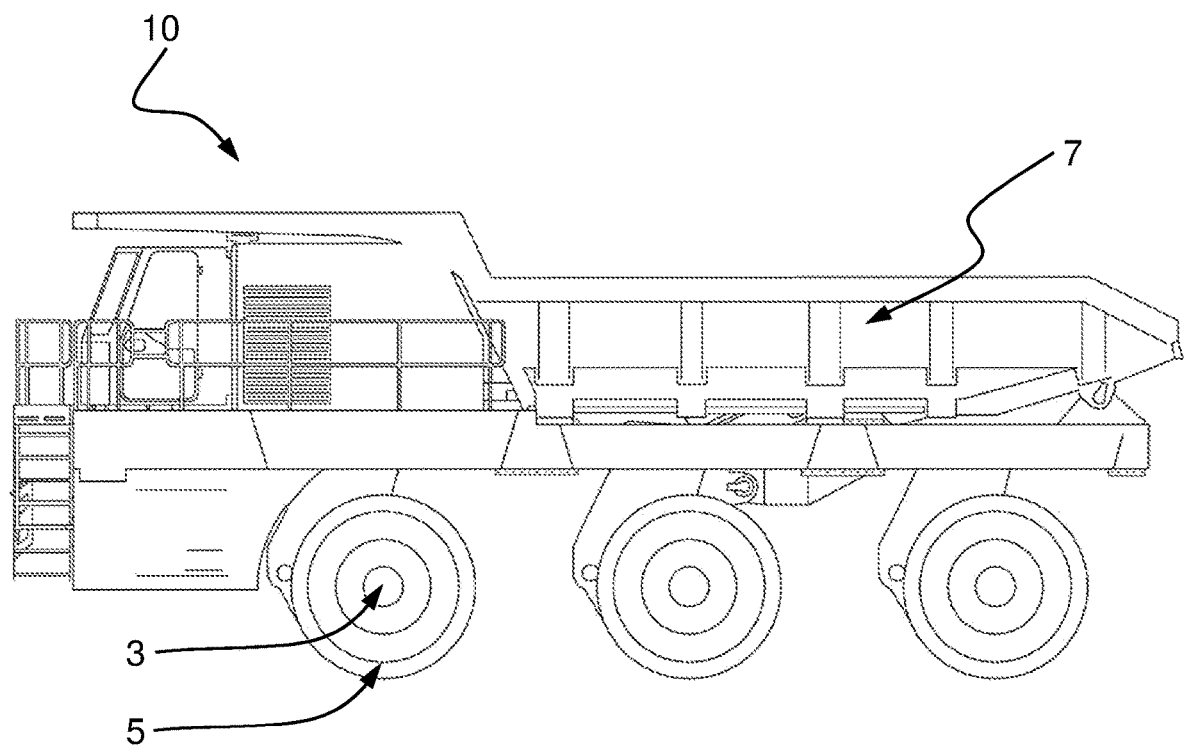
FIG. 1 illustrates a side view of an exemplary embodiment of the cyber-physical hybrid electric autonomous or semi-autonomous dump truck with 3 axles in accordance with aspects of the disclosure.

FIG. 1 shows a cyber-physical vehicle. In this example, the vehicle is a mining dump truck 10 having three axles 3 with four drive wheels 5 on each axle 3. The dump truck 10 comprises the cyber-physical system according to the invention. More particularly, the dump truck 10 comprises: a drivetrain containing an electric motor coupled to a propulsion unit, at least one electric generator connected to an engine for delivering electrical energy to the drivetrain, an energy storage unit for storing and retrieving energy; a cyber-physical system including a sensing system and a control system, the sensor system comprising a plurality of on-board sensors for providing sensory data for use with autonomous or semi-autonomous moving of the vehicle in a cyclic mode along a predefined closed cycle path known to the cyber-physical system; and a handling unit for performing autonomous or semi-autonomous moving of the vehicle along the closed cycle path in the cyclic mode using at least the sensory data, wherein the closed cycle path is determined based on geographical or route data; and wherein the cyber-physical system is configured to equalize the energy levels of the energy storage unit at the closure of one cycle, determined by the complete round-trip performed by the vehicle, under the rates of change of power constraints of the energy storage unit during autonomous or semi-autonomous moving of the vehicle along said closed cycle path.

Although the example in FIG. 1 shows a cyber-physical hybrid electric autonomous or semi-autonomous off-highway dump truck for surface mining industry, various other types of vehicles can be used. For instance, the vehicle may be any other type of wheeled vehicle, a flying vehicle, a naval vehicle, a floating vehicle, a tracked vehicle, a train, a moving robot, a drone, etc. Other kinds of vehicles are also envisaged.

Figure 2:
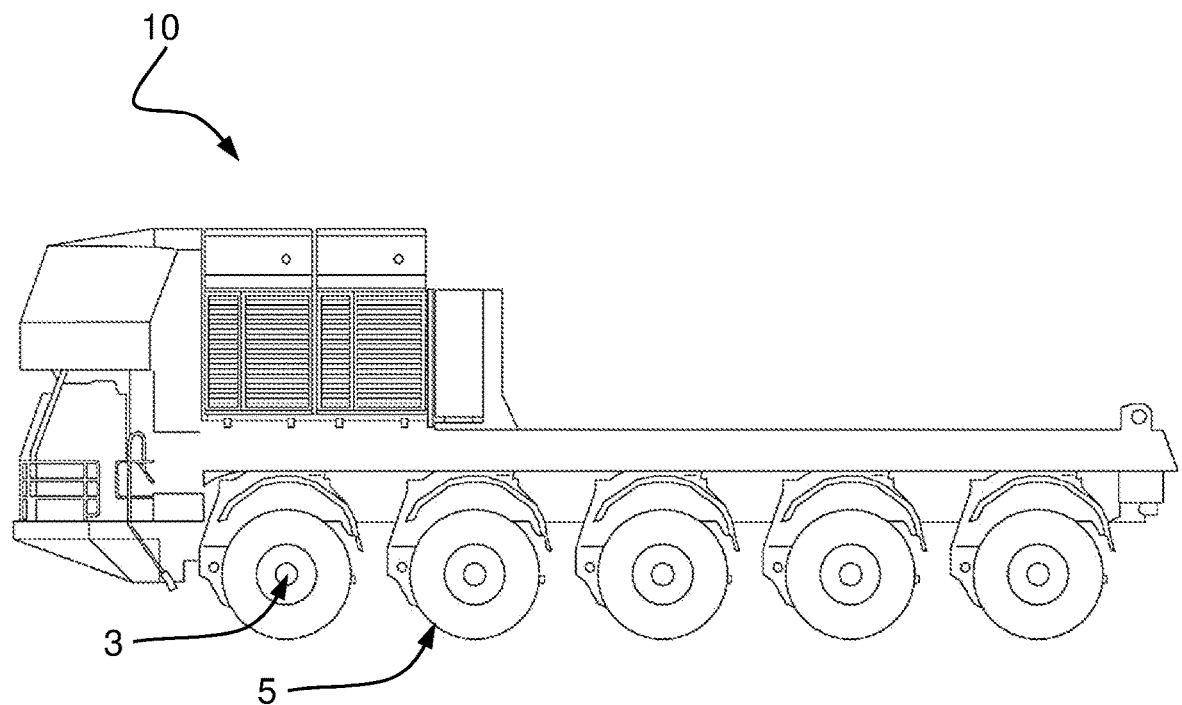
FIG. 2 illustrates a side view of an exemplary embodiment of the cyber-physical hybrid electric autonomous or semi-autonomous dump truck with 5 axles in accordance with aspects of the disclosure.

FIG. 2 shows a cyber-physical mining dump truck 10 having five axles 3 with four drive wheels on each axle 3. As indicated above, the example shows a dump truck 10, however, the invention can be employed for any other kind of vehicle.

In an example, the vehicle is provided with a removable cabin, engine modules, axles, crossbeams, rotary hydrostatic bearings, hoist cylinders, bogies, a central frame and a dump body 7.

The removable cabin may provide the means to operate the mining dump truck in fully autonomous mode where no cabin is needed resulting in lowering the mass of the truck and reducing the power consumption of the mining dump truck.

The removable cabin is not removed when operating the mining dump truck in semi-autonomous mode.

Figure 3:
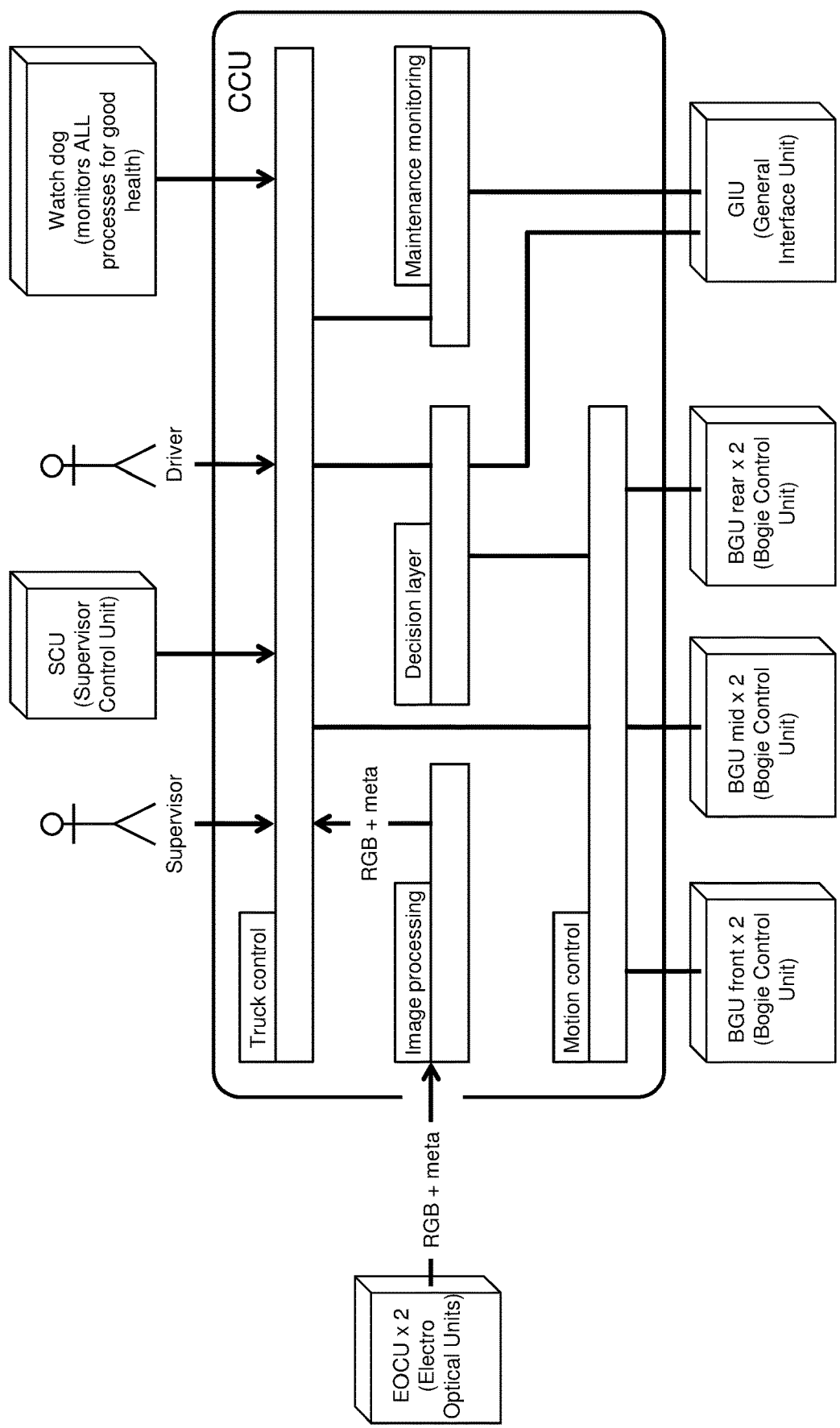
FIG. 3 illustrates the first level of the software layer of the cyber-physical system in accordance with aspects of the disclosure.

The preferred embodiment has a cyber-physical system. It may include a physical layer, a network/platform layer and a software layer. The top-level software layer in the is exemplary detailed using unified modelling language (UML) in FIG. 3.

The cyber-physical system may employ artificial intelligence (AI) algorithms, artificial neural network (ANN) techniques and machine learning (ML) techniques when creating a perception of the physical environment in which the mining dump truck operates.

The cyber-physical system is able to retrieve the exact position of the wheels in the earth-centered earth-fixed (ECEF) coordination system due to the fixed position of the wheels with respect to the respective inertial measurement units. The 3D coordinates of the wheels are used to steer the truck along the predetermined optimum path. This predetermined path is created based on the data of the digital terrain map (DTM). This digital terrain map is obtained by combining satellite data and surveying data of the mine layout.

The exemplary embodiment of the mining dump truck uses hybrid electric technology, where a modular mounted engine is operated at its maximum efficiency providing the mechanical power to an electrical generator. A fuel tank for the engine is mounted on the upper frame as well as a spare fuel tank. In an exemplary embodiment the mining dump truck of 240 metric ton payload is equipped with 2 engines of 460 kW each. The electrical generator (alternator) is the source of the electrical power consumed by the electrical motors driving the individual wheels of the truck. The electrical generators are of the liquid-cooled type resulting in an overall better efficiency. The rotational speed of the electrical generator is adapted to the rotational speed of the motor shaft such that a maximum efficiency is realized. The generator delivers 3-phase AC power that is converted by an AC/DC converter and then the DC power is routed to the inverters where it is converted from DC power to AC power for supplying the power to the electric motors. The electric motors are identical.

Figure 4:
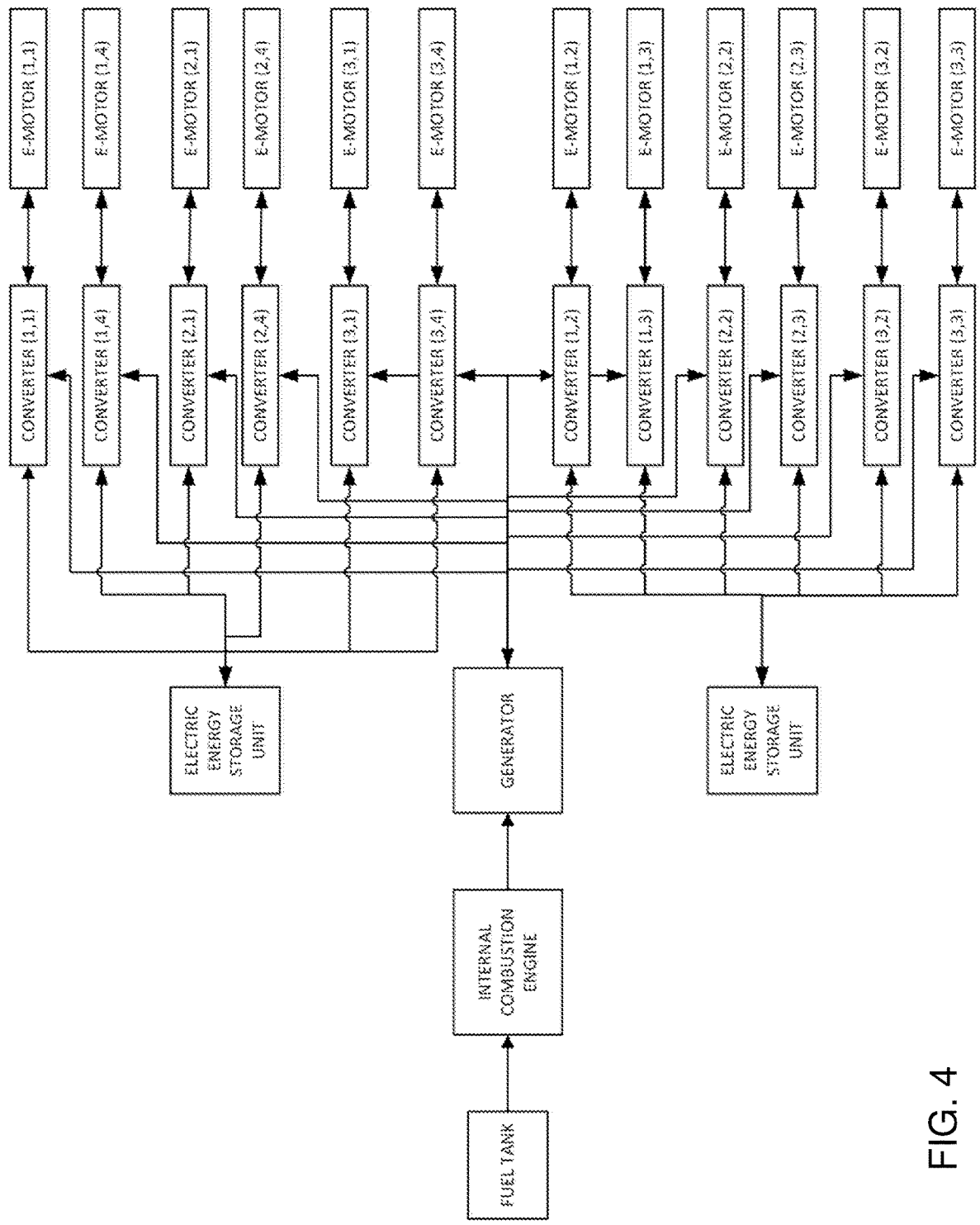
FIG. 4 illustrates the principle schematics of the serial electric hybrid truck in accordance with aspects of the disclosure.

The exemplary embodiment consists of a serial electric hybrid truck according to the principles given in the schematics of FIG. 4. The schematics show the robustness against single failure propagation by indicating that converter (1,1) is connected to another energy storage system than converter (1,2). These converter units located in the same bogie are connected each to a different wheel of the bogie assembly. Failure of a motor, a converter or one of the battery packs will not bring the mining dump truck to a standstill but will reduce its performance and will allow the mining dump truck to move to the maintenance shop.

The wheels are electrically driven. The torque on each wheel is controlled by the cyber-physical system such that an optimum traction can be obtained as function of the environmental conditions as well as on the composition and physical conditions of the soil. The exact position of each wheel is detected through an inertial measurement unit mounted close to the wheel. The information of each inertial measurement unit is transferred to the inertial navigation system that is connected to the cyber-physical system.

A liquid-cooled converter module is used operating as a motor/generator converter. The converter module has both a DC side and a 3-phase AC side. It can control AC induction, permanent magnet, permanent magnet assistance reluctance and magnet free synchronous reluctance motors.

The mining dump truck could be equipped with a scalable stack of lithium nickel manganese cobalt oxide (LiNiMn-$CoO_2$)-NMC battery modules, that are an additional source of electric energy needed for moving the truck especially when driving upwards and to store electric energy when operating the truck in regenerative braking mode going downhill or when the truck needs to brake.

Dynamic braking using a resistor network becomes active in the event of a too large electric energy transfer from the regenerative braking to the electric energy storage unit. In that case the remaining electric energy is dissipated as heat through the resistor network.

The dimensioning of the electric energy storage unit is such that in case of failure of the power pack units the mining dump truck is not put to a standstill but can move with reduced performance to the maintenance bay to repair or exchange the power pack unit.

In the exemplary embodiment the electric energy storage unit contains battery modules that have an electric energy storage capacity of 24400 Wh per module. The stacked battery modules are contained in an isolated weatherproof enclosure that can, in the event of defect or at the end of the battery's life, be exchanged ON and OFF the truck using a dedicated lifting tool.

The battery modules are mounted preferably below the central frame of the truck along the central beam of the chassis to have a maximum exchange of heat with the soil and to lower the centre of gravity of the mining dump truck. This positioning below the central frame allows for a quick exchange of the battery modules as well as easy connectives for recharging and maintenance.

The cyber-physical system communicates and controls the Li-ion NMC battery management system.

The positioning of the battery modules below the central frame reduces the distance between the electrical motors and the battery modules. This architecture reduces the inductance created by the length and diameter of the cabling system. The cabling system consists of flame-retardant material and is equipped with the necessary mechanical protection against sharp objects and projectiles coming from the soil. The cabling system is also designed to withstand the most common fluids (fuel, oil, cleaning agents . . . ) used.

The electric energy storage unit has provisions for the connection of supercapacitors. The mounting of supercapacitors depends on the specific mine profile. The supercapacitors are used when large rate of change in the electric power are expected. A typical supercapacitor module can deliver a rate of change in electric power of 670 kW/s. Mounting one supercapacitor module per axle should provide sufficient electrical power to smooth power peak whenever needed.

The truck is equipped with a meteorological mast providing the cyber-physical system (CPS) with the local environmental conditions (temperature, relative humidity, rain, wind, solar radiation, pressure, . . . ). These local environmental conditions are taking in consideration by the cyber-physical system (CPS) to optimize the traction of the truck resulting in an improvement of the overall performance.

A wireless remote-control exists on the truck such that an operator can control remotely the truck. This is especially the case when moving the truck in the maintenance bay.

The semi-autonomous operation is also used when the truck is in learning mode. The truck acquires in the learning mode details of the path that has repeatedly to be run in the surface mine. The on-board navigation algorithms are fine-tuned in this learning mode.

Regenerative braking, an energy recovery mechanism, is used to convert the kinetic energy $T=\frac{1}{2}(m_{laden}+\Sigma_{i=1}^{N}n_i m_{wheel})v^2$ where N is the number of axles on the truck and $n_i$ is the number of wheels on axle i of the mining dump truck to electric energy to charge the electric energy storage unit when driving downwards. The regenerative braking uses the electric motors mounted in the bogie to operate in generator mode. When moving downwards, a selectable part of the electric motors can be switched to generator mode. The other electric motors remain in their drive mode such that smooth cornering remains in operation. It is possible to put all the electric motors in generator mode and this is recommended on straight segments of the mine trajectory when driving downhill. The cyber-physical system (CPS) is controlling these energy transfers.

The dump time and the load time are important parameters in the optimization of the dump truck modes of operation. The typical dump time is 160 s, and the typical load time is 310 s for a truck of 240 metric ton. At these events the electric energy storage unit can be charged while the truck is not moving. The cyber-physical system optimizes the charging time as being a fraction of the load time of the truck as well as during the trajectory by monitoring the predetermined rate of change of the electric power. This fraction of the load time is selected such that round-trip energy difference value, that is the difference between the electric energy level at the reference point of the closed cycle path, over one round trip, is approximately zero. This round-trip energy difference value being approximately zero is the optimum for any electric hybrid mining dump truck. The tolerance on the round-trip energy difference value of zero is for the case described in FIG. 6 0.657 kWh on an electric energy storage capacity of 1757 kWh. This round-trip energy difference value optimization objective has a tight upper tolerance of approximately 0.037 percent and is only achievable when using a cyber-physical system. This tolerance guarantees that the electric energy storage unit will not saturate within a yearly haulage hour budget of 8688 hours as well as in case of emergency braking. The cyber-physical system readjusts the fraction of the load time after having monitored the energy level of the electric energy storage unit at each round trip and adapts the rate of change of power during the predetermined path. Fast charging is mandatory for the overall efficiency of the haulage operation and thus the mining dump truck is equipped with extremely fast charging (XFC) batteries with typical charging times of 5 minutes. These batteries use carbon-ion (C-Ion) technology. Other battery types like aluminium-ion, lithium-ion NMC, lithium titanium oxide LTO or Grabat, that is a graphene-based battery, or a combination of these battery types are possible for the mining dump truck. Graphene based supercapacitors could be added, based on the required rate of change of power dictated by the mine layout and operational scenarios.

The electric energy storage unit setup is designed for each specific mine layout. The parameters of the electric energy storage unit will have to change over time because the landscape of the surface mine evolves over its lifetime or because of the reallocation of the mining dump trucks to other closed cyclic tracks in the surface mine.

The mining dump truck can easily be reconfigured for another task by modifying its modular power pack units and electric energy storage unit as well as selecting new trajectories in the digital terrain map that need to be covered by the mining dump truck. The optimization of these modes of operation is performed by the cyber-physical system (CPS).

Figure 5:
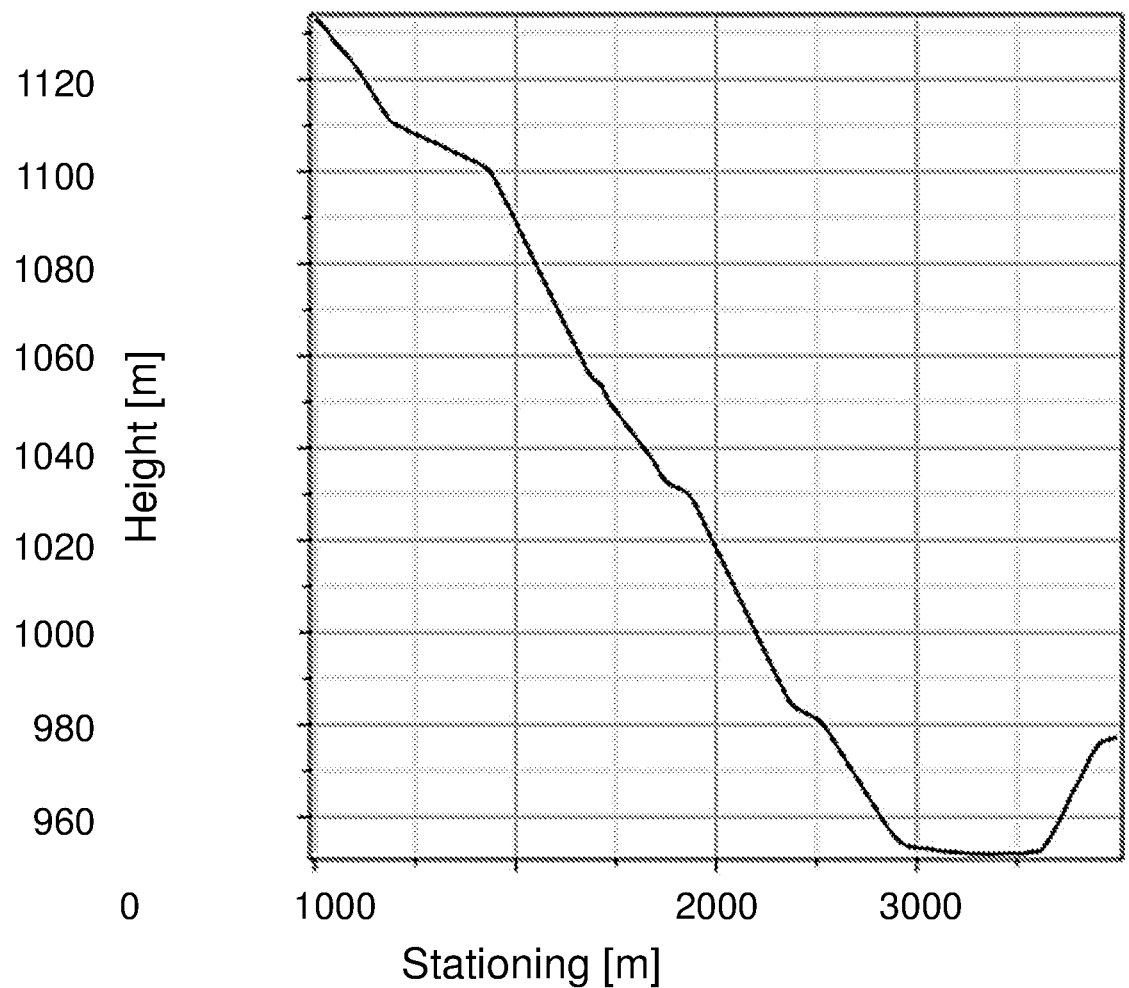
FIG. 5 illustrates a 2D-representation (stationing versus height) of half of the closed cyclic track 1 of a mine layout.
Figure 6:
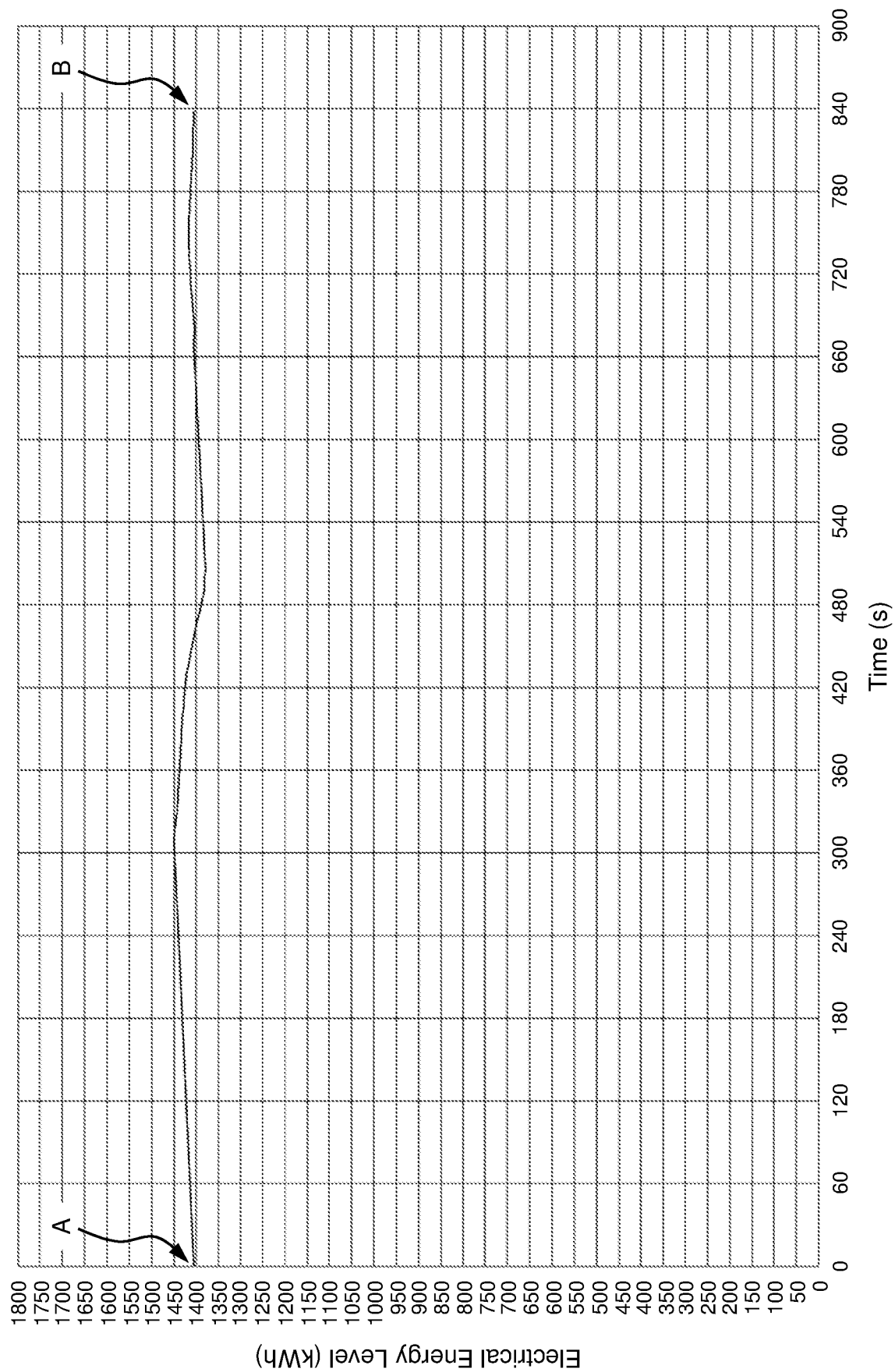
FIG. 6 illustrates the electric energy housekeeping for a 240 metric ton 20×20 cyber-physical hybrid electric autonomous dump truck, powered with 920 kW engine and 72 NMC battery packs of 24.4 kWh each and showing that the electric energy level after one round trip (closed cycle path) is recovered for the loaded truck running downhill and the empty truck running uphill in accordance with aspects of the disclosure.

In some cases, the mine layout allows for nearly full electric operation where the hybrid electric truck can switch-off its engine and operate only on electricity while moving. It is only at the dump and/or load site that the engine is activated for a short time to charge up the batteries. FIG. 5 shows half of the cyclic closed track 1 in a mine layout where a loaded hybrid dump truck must drive downhill and dump its payload at the end of half of the closed cyclic track 1. FIG. 6 shows for the given half of the closed cyclic track 1 the energy housekeeping, performed by the cyber-physical system, resulting in very low emission when the dump truck moves between the load and dump sites. A cyclic energy level of the electric energy storage unit is controlled. During autonomous driving of the dump truck from a start point to an end point along said travel path, rates of change of power are controlled based on a desired velocity such as to reduce a difference in energy levels of the electric energy storage unit between the start point A and the end point B. In this example, the rates of change of power are adjusted in order to minimize the difference in energy levels between start and end points A, B. More particularly, in this advantageous example, the difference is minimized to substantially zero. Both start and end point are at 1400 kWh. It is also envisaged that the difference is to reduce to smaller than 5%, for instance smaller than 2%, even more preferably smaller than 1%. Even smaller differences are also possible.

Figure 7:
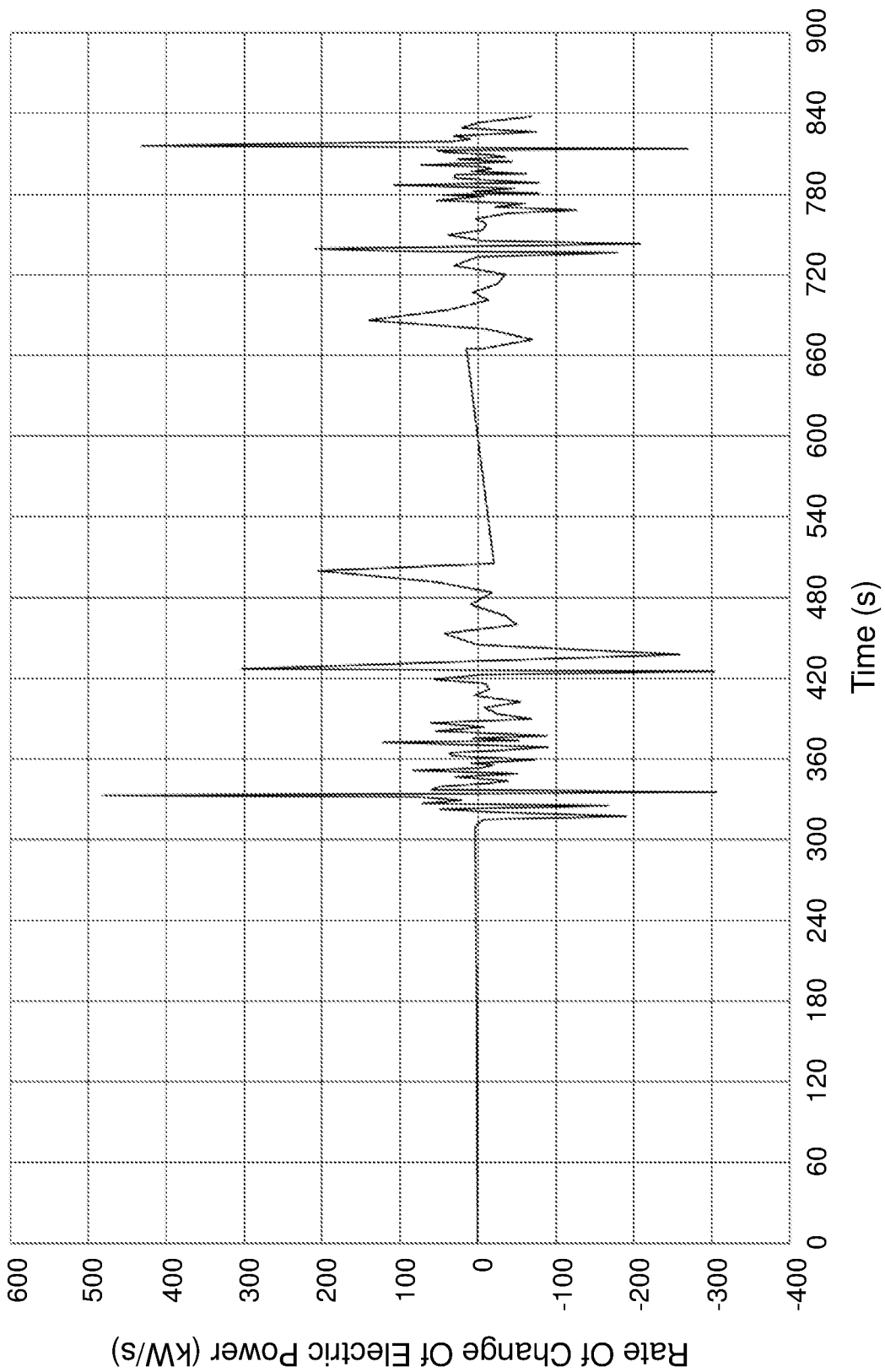
FIG. 7 illustrates the rate of change of the electric power for a 240 metric ton 20×20 cyber-physical hybrid electric autonomous dump truck, powered with 920 kW engine and 72 NMC battery packs of 24.4 kWh each and showing that the rate of change of the power is within the battery unit limits of charge rate of 720 kW/s and discharge rate of −1080 kW/s over the predetermined closed cycle path.

FIG. 7 shows for the given half of the closed cyclic track 1 the rate of change of the electric energy storage unit.

Figure 8:
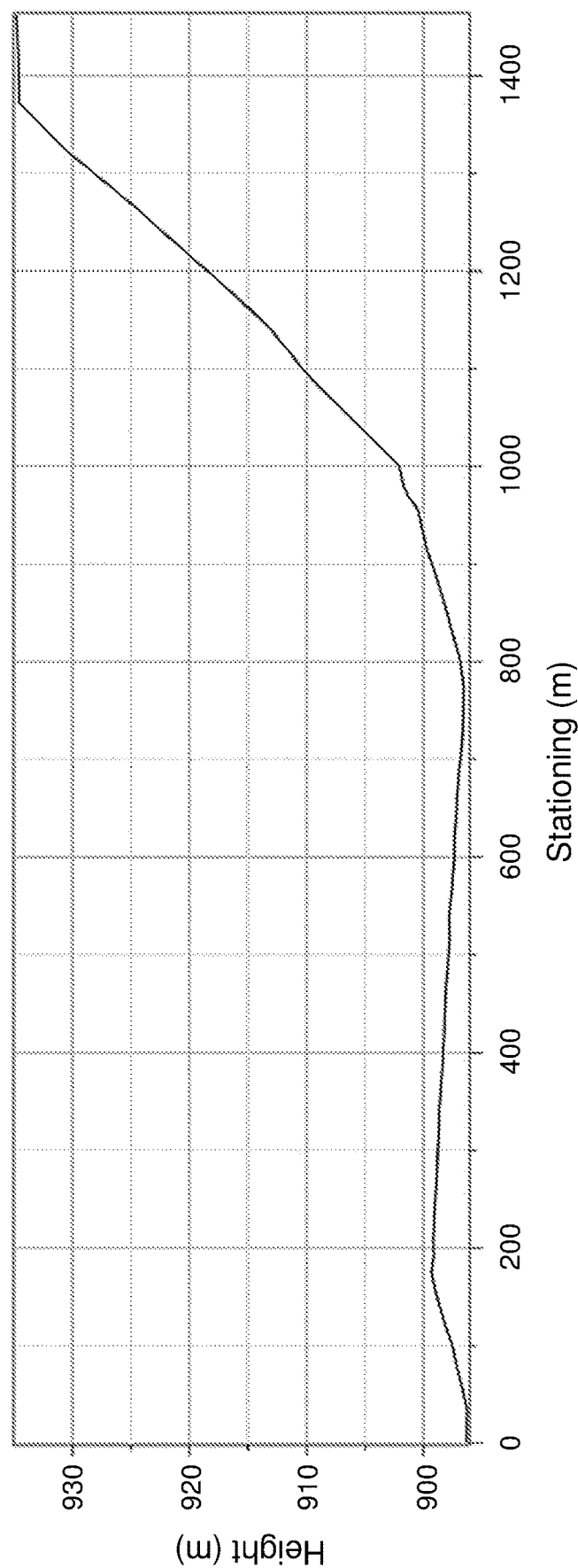
FIG. 8 illustrates a 2D-representation (stationing versus height) of half of the closed cyclic track 2 of a mine layout.

FIG. 8 shows half of the closed cyclic track 2 in a mine layout where a loaded hybrid dump truck must drive uphill and dump its payload at the end of half of the closed cyclic track 2.

Figure 9:
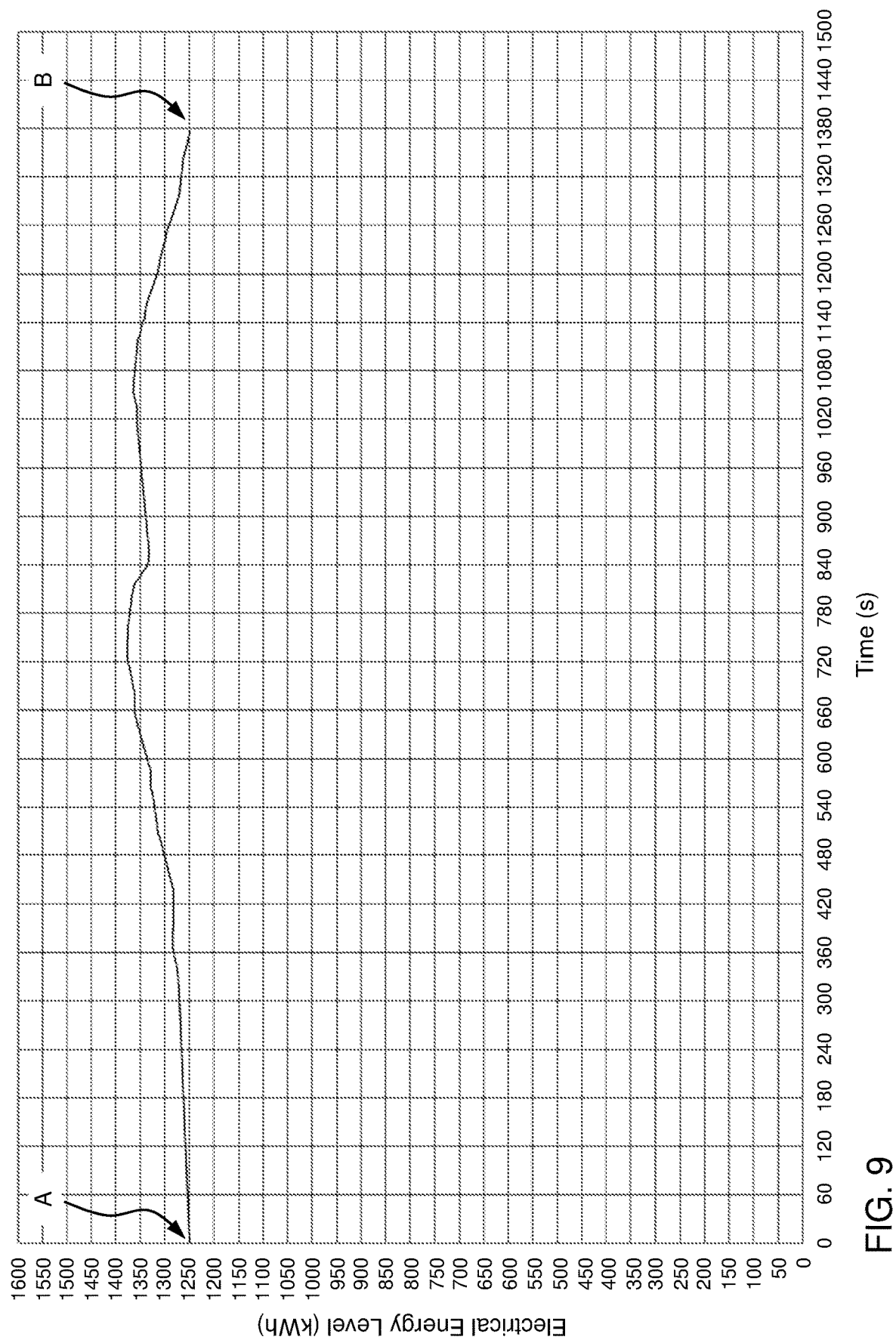
FIG. 9 illustrates the electric energy housekeeping for a 240 metric ton 20×20 cyber-physical hybrid electric autonomous dump truck, powered with 920 kW engine and 64 NMC battery packs of 24.4 kWh each and showing that the electric energy level after one round trip (closed cycle path) is recovered for the loaded truck running uphill and the empty truck running downhill in accordance with aspects of the disclosure.

FIG. 9 shows for the given exemplary half of the closed cyclic track 2 the energy housekeeping, performed by the cyber-physical system (cf. control system thereof), resulting in zero emission when the dump truck moves between the load and dump sites. The control system of the cyber-physical system of the dump truck is configured to control a cyclic energy level of the electric energy storage unit, wherein rates of change of power during autonomous driving of the hybrid dump truck from a start point to an end point along said travel path are controlled based on a desired velocity such as to reduce a difference in energy levels of the electric energy storage unit at the end point B and at the start point A with A=B being the reference point of the closed cycle path. In this example, during autonomous driving along the closed cycle path, the rates of change of power are adjusted such as to minimize the difference in energy levels at the reference point of the closed cycle path. More particularly, in this advantageous example, the difference is minimized to substantially zero.

In some examples, the control system minimizes the difference to smaller than 5%, more preferably smaller than 2%, even more preferably smaller than 1%. A smaller difference, for instance smaller than 0.5% may be highly desired for some examples.

The energy levels of the electric energy storage unit at the end point B and the start point A is in a range of 75% to 90%. However, other ranges may also be employed, depending on the electric energy storage unit used. In this way, the lifetime of the energy storage unit can be increased.

Figure 10:
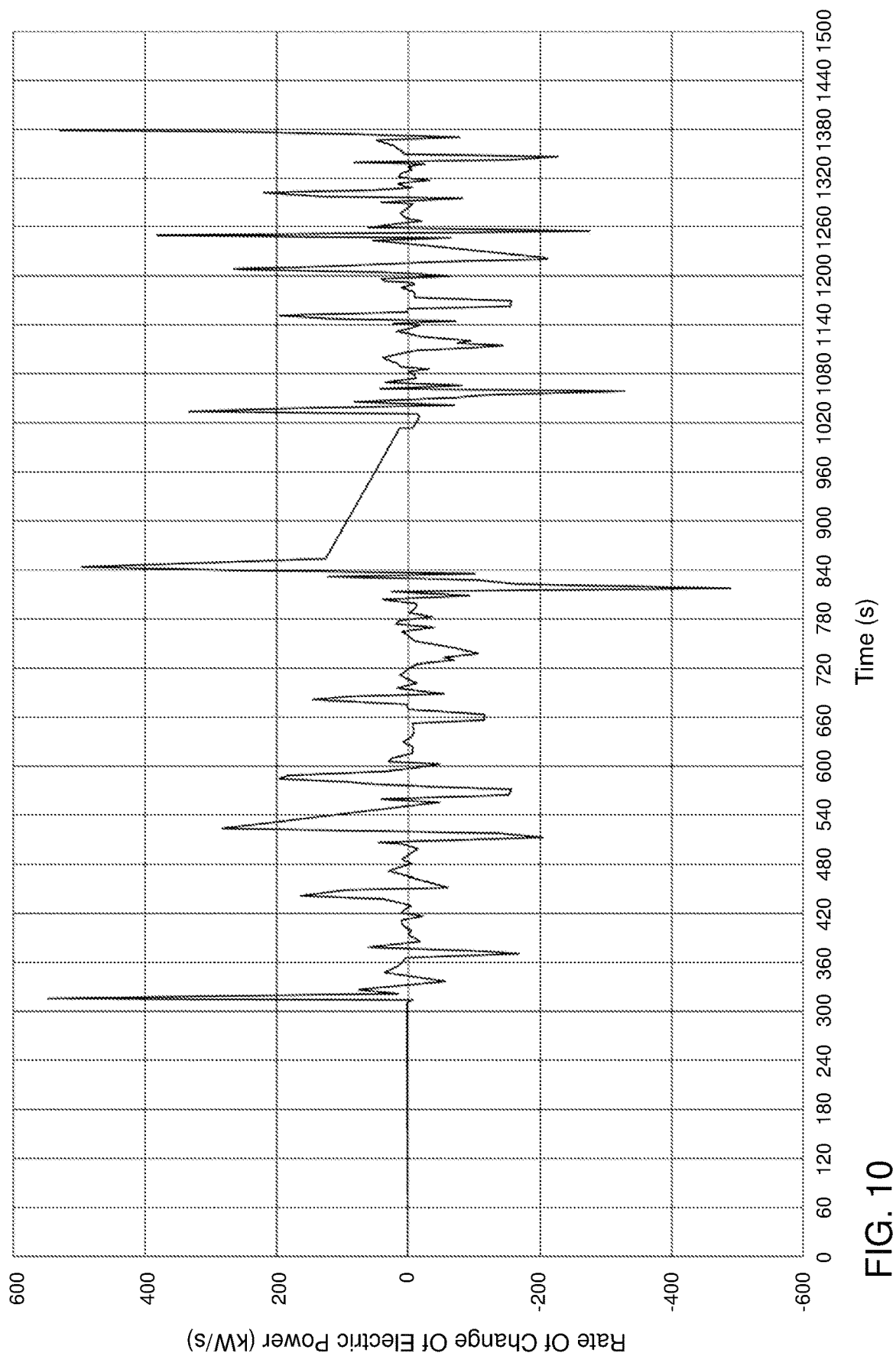
FIG. 10 illustrates the rate of change of the electric power for a 240 metric ton 20×20 cyber-physical hybrid electric autonomous dump truck, powered with 920 kW engine and 64 NMC battery packs of 24.4 kWh each and showing that the rate of change of the power is within the battery unit limits of charge rate of 640 kW/s and discharge rate of −960 kW/s over the predetermined closed cycle path.

FIG. 10 shows for the given half of the closed cyclic track 2 the rate of change of the electric energy storage unit.

Figure 11:
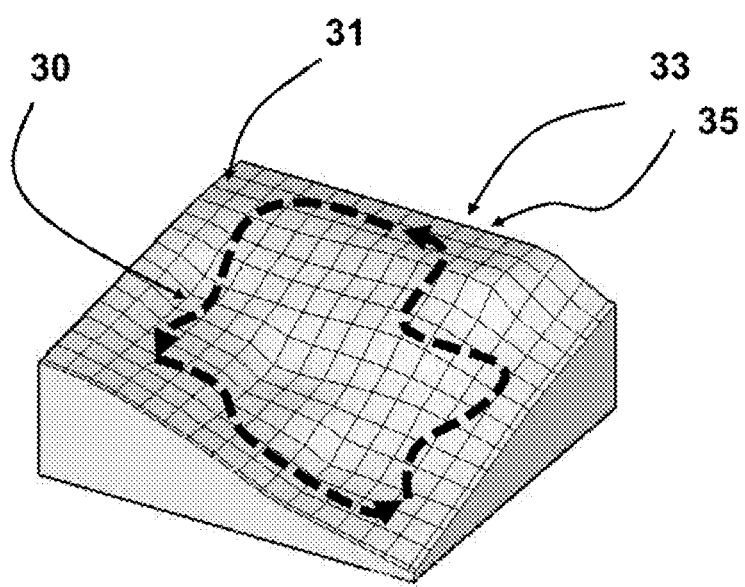
FIG. 11 illustrates an exemplary closed cycle path.

FIG. 11 illustrates an exemplary closed cycle path 30. The closed cycle path 30 follows a 3D dimensional route/path along a topographic surface 31. This topographic surface 31 may represent a surface of a mining area for example. It will be appreciated that the closed cycle path 30 may have various sizes and shapes. In this example, the closed cycle path 30 has a begin point 33 and end point 35 at a same location (making it a closed loop). The vehicle may for instance be a wheeled vehicle (e.g. dump truck on a mining area) configured to drive on a ground surface. However, it is also possible that different kind of vehicles are used, such as for instance a flying aerial vehicle configured to fly over the ground surface along the closed cycle path 30.

Figure 12A:
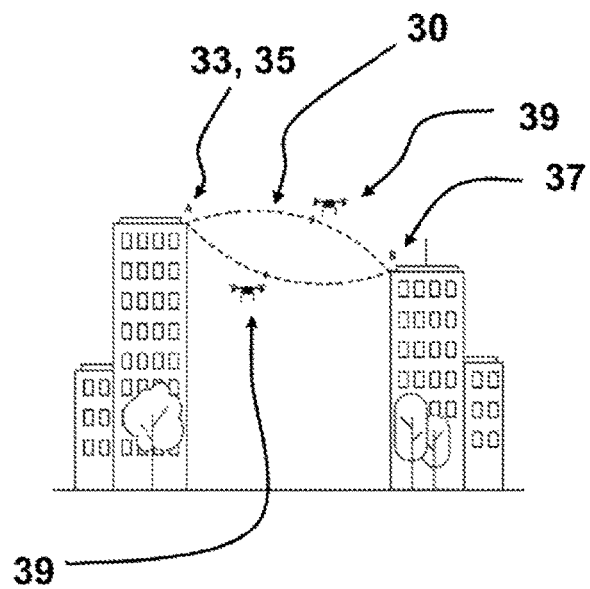
FIG. 12A, 12B, 12C illustrate exemplary closed cycle paths.
Figure 12B:
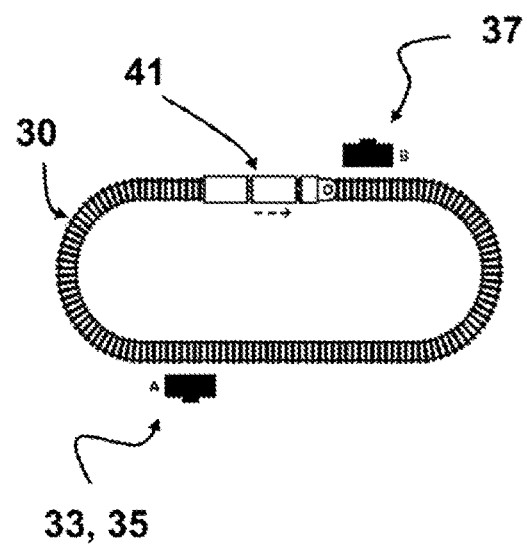
Figure 12C:
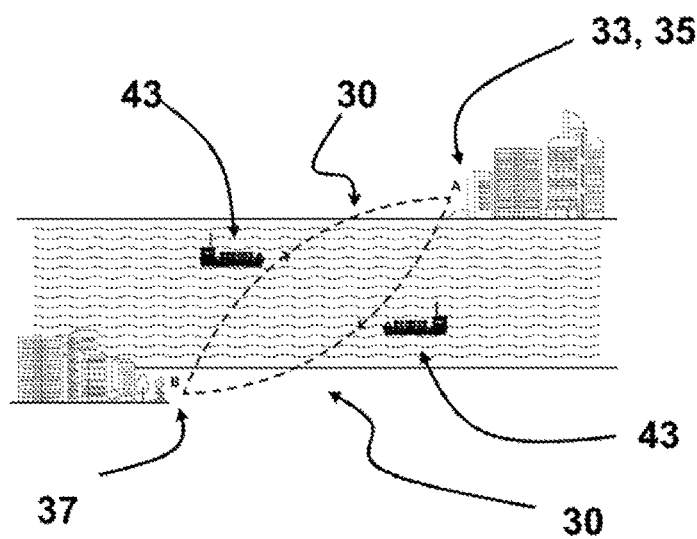

FIG. 12A, 12B, 12C illustrate exemplary closed cycle paths 30 with different types of vehicles. FIG. 12A shows an unmanned aerial vehicle (UAV) 39 flying from a begin point 33 at a first location to an intermediate point 37 at a remote second location, and back to an end point 35 corresponding to the begin point, making the path 30 a closed cycle path (loop). The closed cycle path 30 may include a different number of intermediate points. It is also envisaged that other kinds of closed cycle paths 30 are selected. In FIG. 12B, the vehicle is a train 41 following a closed track. The closed cycle path 30 may have one or more intermediate points 37 (e.g. loading/unloading station). In this example the begin and end points 33, 35 are located at a same location at an exemplary station. FIG. 12C shows an exemplary naval vehicle 43 (a boat in this example) travelling from point 33 to point 37 and back to point 35, making it a closed cycle path. The closed cycle path 30 may be predetermined, allowing to determine the power requirements for achieving the displacements.

In the various above examples with different vehicles and closed cycle paths 30, the cyber-physical system of the vehicle may be configured to equalize the energy levels of the energy storage unit at the closure of one cycle, determined by the complete round-trip performed by the vehicle, under the rates of change of power constraints of the energy storage unit during autonomous or semi-autonomous moving of the vehicle along said closed cycle path.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), system-on-chip (SoC/MPSoC), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

"Optional" or "optionally" means that the subsequently described, feature, event or circumstance may or may not occur, and that the description includes instances where said feature, event or circumstance occurs and instances where it does not.

In the claims, any reference signs placed between parentheses shall not be construed as limiting the claim. The word 'comprising' does not exclude the presence of other features or steps than those listed in a claim.

Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A vehicle comprising:
a drivetrain containing an electric motor coupled to a propulsion system;
at least one electric generator connected to an engine for delivering electrical energy to the drivetrain;
an energy storage system for storing and retrieving energy;
a cyber-physical system including a sensing system and a control system, the sensing system comprising a plurality of on-board sensors for providing sensor data for use with autonomous or semi-autonomous moving of the vehicle in a cyclic mode along a predefined closed cycle path known to the cyber-physical system, wherein the closed cycle path defines a complete round-trip for the vehicle; and
a handling system for performing autonomous or semi-autonomous moving of the vehicle along the closed cycle path in the cyclic mode using at least the sensor data, wherein the closed cycle path is determined based on geographical or route data; and
wherein the cyber-physical system is configured to equalize energy levels of the energy storage system at the closure of said closed cycle path, determined by the complete round-trip performed by the vehicle, subject to constraints on rates of change of power of the energy storage system during autonomous or semi-autonomous moving of the vehicle along said closed cycle path.

2. The vehicle according to claim 1, wherein equalization of the energy levels of the energy storage system is based on a desired velocity in order to reduce a difference in energy levels of the energy storage system at a reference point, being the start and end point of the closed cycle path.

3. The vehicle according to claim 2, wherein said difference in energy of the energy storage system over the given closed cycle path is minimized to zero.

4. The vehicle according to claim 1, wherein equalization of the energy levels of the energy storage system is based on a predefined longitudinal velocity.

5. The vehicle according to claim 4, wherein the predefined longitudinal velocity is selected in order to maximize key performance indicators of the vehicle.

6. The vehicle according to claim 1, wherein rates of change of power are adjusted during autonomous or semi-autonomous moving along said travel path in order to minimize an energy difference over the given closed cycle path.

7. The vehicle according to claim 1, wherein the control system is configured to control said rates of change of power of the energy storage system based at least on an amount of payload carried by the vehicle along the predetermined closed cycle path.

8. The vehicle according to claim 1, wherein the energy storage system is an electric storage system wherein the control system is configured to control said rates of change of power of the electric energy storage system so as to avoid charging over 95% of a maximal electric energy capacity or discharging below 5% of a maximal electric energy capacity of said electric energy storage system.

9. The vehicle according to claim 1, wherein the energy storage system is an electric storage system wherein the control system is configured to select said rates of change of power of the electric energy storage system and charging and discharging time intervals such that an overall energy consumption is minimized.

10. The vehicle according to claim 1, wherein the energy levels of said energy storage system at the reference point of the closed cycle path are in a range of 20% to 90% of a maximal energy capacity of said energy storage system.

11. The vehicle according to claim 1, wherein the control system is configured to employ a trained artificial neural network (ANN) for controlling said rates of change of power of the energy storage system during autonomous or semi-autonomous moving, wherein the artificial neural network is trained based on historical data stored by the cyber-physical system.

12. The vehicle according to claim 1, wherein the cyber-physical system includes a plurality of embedded systems, in a wheel topology, distributed at different locations of the vehicle, forming a decentralized network.

13. The vehicle according to claim 1, wherein the sensing system comprises a situational awareness system.

14. The vehicle according to claim 1, wherein the engine is a hydrogen-based power pack system.

15. The vehicle according to claim 1, wherein the energy storage system is a fuel-cell battery or a kinetic energy storage system.

16. The vehicle according to claim 1, wherein the engine is equipped with an auto shutdown mechanism, wherein the auto shutdown mechanism is arranged to automatically shut down based on an event detected by the cyber-physical system.

17. The vehicle according to claim 1, wherein the vehicle is configured to operate in full autonomous mode, wherein the vehicle is arranged without a command post or cabin.

18. The vehicle according to claim 17, wherein the vehicle is a hybrid electric dump truck arranged for surface mining, and wherein the hybrid electric dump truck comprises: at least two axles with wheels associated therewith; a distributed drivetrain composed of systems each containing an electric motor coupled to a wheel via a gearbox.

19. The vehicle according to claim 1, wherein the energy storage system is connected to an on-board trolley system with pantograph allowing the vehicle to connect to an electric grid distributed along said closed cycle path such as to operate in full electric mode.

20. The vehicle according to claim 1, wherein the vehicle is a wheeled motor vehicle.

21. The vehicle according to claim 1, wherein the vehicle is a naval vessel.

22. The vehicle according to claim 1, wherein the vehicle is a flying vehicle.

23. The vehicle according to claim 1, wherein the vehicle is a hybrid dump truck.

24. A method for controlling a vehicle, the vehicle comprising a drivetrain containing an electric motor coupled to a propulsion system, at least one electric generator connected to an engine for delivering electrical energy to the drivetrain, a rechargeable energy storage system for storing and retrieving energy, a cyber-physical system including a sensing system and a control system, the sensor system comprising a plurality of on-board sensors for providing sensor data for use with autonomous moving of the vehicle in a cyclic mode along a predefined closed cycle path known to the cyber-physical system, wherein the closed cycle path defines a complete round-trip for the vehicle; wherein a handling system is provided for performing autonomous moving of the vehicle along the closed cycle path in the cyclic mode using at least the sensor data, wherein the closed cycle path is determined based on geographical or route data; wherein the cyber-physical system is configured to equalize energy levels of the energy storage system at the closure of said closed cycle path, determined by the complete round-trip performed by the vehicle, subject to constraints on the rates of change of power of the energy storage system during autonomous or semi-autonomous moving of the vehicle along said closed cycle path.

25. A cyber-physical system for a vehicle, the vehicle including a drivetrain containing an electric motor coupled to a propulsion system, at least one electric generator connected to an engine for delivering electrical energy to the drivetrain, an energy storage system for storing and retrieving energy, and a handling system for performing autonomous or semi-autonomous moving of the vehicle along a closed cycle path in a cyclic mode using at least sensor data, wherein the closed cycle path defines a complete round-trip for the vehicle, wherein the closed cycle path is determined based on geographical or route data, the cyber-physical system comprising:
- a sensing system, the sensing system comprising a plurality of on-board sensors for providing the sensor data for use with autonomous or semi-autonomous moving of the vehicle in a cyclic mode along a predefined closed cycle path known to the cyber-physical system; and
- and a control system;
- wherein the cyber-physical system is configured to equalize energy levels of the energy storage system at a closure of said closed cycle path, determined by a complete round-trip performed by the vehicle, subject to constraints on rates of change of power constraints of the energy storage system during autonomous or semi-autonomous moving of the vehicle along said closed cycle path.

* * * * *